United States Patent [19]
Li et al.

[11] Patent Number: 5,734,893
[45] Date of Patent: Mar. 31, 1998

[54] PROGRESSIVE CONTENT-BASED RETRIEVAL OF IMAGE AND VIDEO WITH ADAPTIVE AND ITERATIVE REFINEMENT

[75] Inventors: Chung-Sheng Li, Ossining; John Joseph Edward Turek, South Nyack; Vittorio Castelli, White Plains; Ming-Syan Chen, Yorktown Heights, all of N.Y.

[73] Assignee: IBM Corporation, Armonk, N.Y.

[21] Appl. No.: 535,500

[22] Filed: Sep. 28, 1995

[51] Int. Cl.⁶ .................................................. G06F 17/30
[52] U.S. Cl. ........................ 395/615; 395/604; 395/605; 382/203
[58] Field of Search .................................. 395/605, 604, 395/10, 602, 615, 603, 611; 382/201, 203

[56] References Cited

U.S. PATENT DOCUMENTS

| | | | |
|---|---|---|---|
| 5,404,506 | 4/1995 | Fujisawa et al. | 395/604 |
| 5,477,272 | 12/1995 | Zhang et al. | 348/407 |
| 5,524,257 | 6/1996 | Koike et al. | 395/800 |
| 5,590,319 | 12/1996 | Cohen et al. | 395/604 |

OTHER PUBLICATIONS

Bimbo et al., "Sequence Retrieval by Contents through Spatio Temporal Indexing", IEEE on CD–ROM, pp. 88–92, Aug. 24, 1993.

Hou et al., "Medical Image Retrieval by Spatial Features", IEEE on CD–ROM, pp. 1364–1369, Oct. 18, 1992.

Hirzalla et al., "A Multimedia Query User Interface", IEEE on CD–ROM, pp. 590–593, Sep. 5, 1995.

*Primary Examiner*—Thomas G. Black
*Assistant Examiner*—Greta L. Robinson
*Attorney, Agent, or Firm*—Douglas Cameron; Anne Vachon Dougherty

[57] ABSTRACT

A method and apparatus for minimizing the time required to obtain results for a content based query in a data base. More specifically, with this invention, the data base is partitioned into a plurality of groups. Then, a schedule or sequence of groups is assigned to each of the operations of the query, where the schedule represents the order in which an operation of the query will be applied to the groups in the schedule. Each schedule is arranged so that each application of the operation operates on the group which will yield intermediate results that are closest to final results.

23 Claims, 6 Drawing Sheets

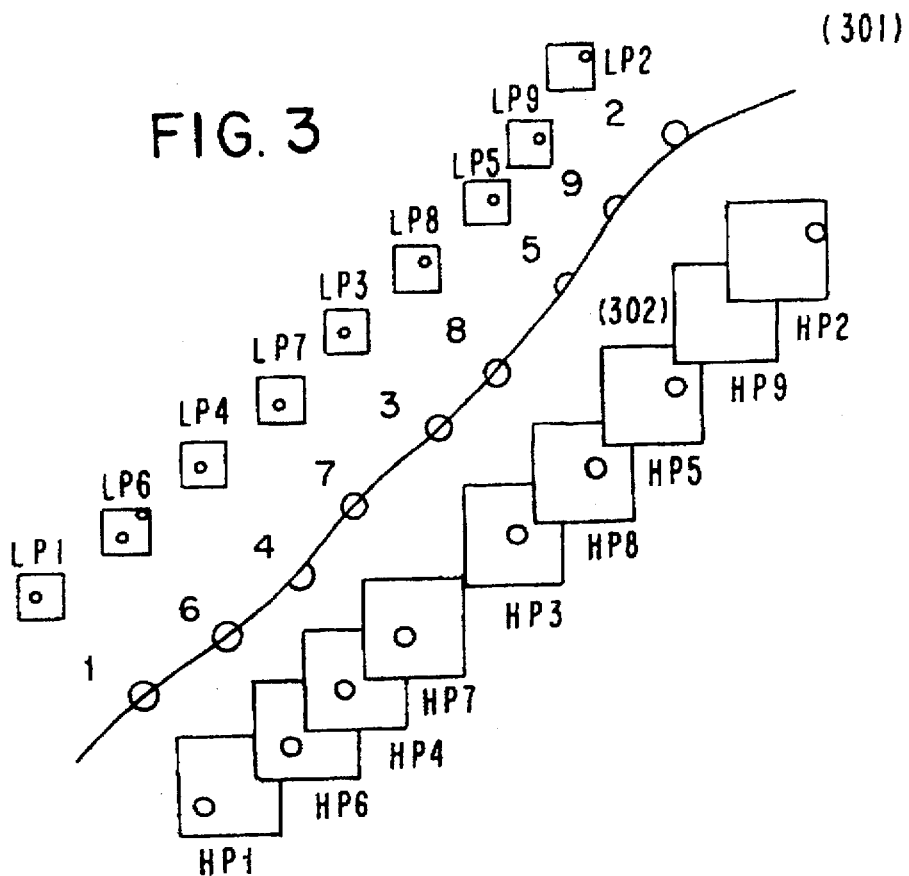
FIG. 3
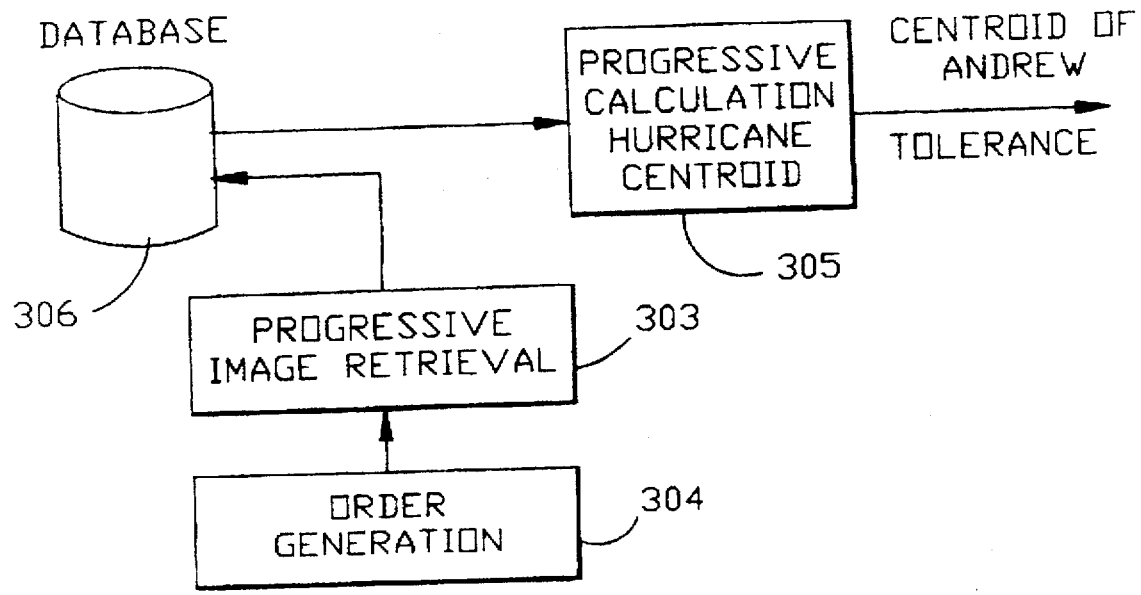

1

PROGRESSIVE CONTENT-BASED RETRIEVAL OF IMAGE AND VIDEO WITH ADAPTIVE AND ITERATIVE REFINEMENT

The United States Government has rights in this invention pursuant to Contract No. NASA/CAN NCC5-101 awarded by NASA.

DESCRIPTION

1. Technical Field

This invention relates to content based retrieval of data from a data base. More specifically, this invention minimizes the time between the initiation of the query and the obtaining of the final results.

2. Description of the Prior Art

Efficient indexing techniques such as B-tree exist for conventional relational databases with single or multiple attributes. Both existence and range types of queries could be supported through these indexing techniques. The speedup of the query processing is usually achieved by pipeline and/or parallel processing of the execution steps involved in a query. Furthermore, due to the unambiguous nature of the query and attributes, these types of queries do not allow approximate results.

For databases with single- or multi-dimensional array attributes such as time-series, images, audios, and video clips, indexing can be accomplished through

- indexing on the metadata (such as time, place, content keywords, etc.) that describe the array attributes;
- indexing on the features extracted from the array attributes;
- indexing or searching directly on the array attributes.

Note that indexing through the metadata is identical to conventional indexing, while indexing either directly or through features requires defining some forms of similarity measure (such as Euclidean distance) and nonexact matches are the predominant forms of searching.

A content based query is formulated in one or more of the following ways. The query could be presented by way of an example of the target. For example, the query could be a drawing of a mountain, or of a cartoon character. Another query could be the provision of features of the target to be found in the database. For example, in the case of an image, one could use characteristics of the image such as its Fourier coefficients, its color histogram or its texture, where the image is representative of the target. Another query could be in the form of specifying the semantics of the targets. For example, one might be looking for cities having surrounding forests, where the city may be vulnerable to forest fires. In the latter case, semantics would be cities surrounded by forests. A content based search is to be distinguished from, for example, a key word search, where only matching of alphanumeric text is required.

When a nonexact search or indexing operation is performed on database with array attributes, the response time to complete such a transaction usually monotonically increases with

- the number of entries in the database,
- the dimension of the array attributes,
- the size of each dimension,
- the numerical accuracy of each element in the array attributes, and
- the complexity of the query.

Due to the nature of these types of queries, it is unlikely an original query will locate the desired results. Therefore, allowing the user to iteratively refine the query based on the intermediate results is essential for locating and obtaining those desired spatial or spatial-temporal items. Even if the intermediate results are not completely accurate, the availability of these results could still significantly speedup the query process. A long response time resulting from limited network or disk bandwidth and computation power is highly undesirable in processing these types of queries.

As an example, in the current literature, a search engine such as the IBM Infogate (Information Gateway) allows the user to interactively modify the query keywords if the search results are either too many or too few. Simple rules also exist in Yahoo (An Internet World Wide Web search engine) to limit the number of entries retrieved. Keyword searches can be discussed as an alternative way to perform searches as opposed to content-based search, but the former approach is limited in the sense that the searches can be performed only if the contents of the database entries can be extracted as keywords.

Previously, Sridharan, Ginige, and Lowe taught progressive visualization and progressive transmission of an image using vector quantization on the difference pyramid in "Progressive Image Transmission," International Conference on Image Processing and Its Applications (conf. publ. no. 354), 1992, pp. 115–118. In "Scanning Strategies for Target Detection," SPIE vol. 1470 (pp. 148–166), 1991, Gertnor and Zeevi taught a progressive acquisition scheme, generalized raster scan, to produce partial images with progressive resolution. This scheme allows faster target detection and identification. In "Scalable Compression for Image Browsing," IEEE Trans. on Consumer Electronics, vol. 40. no. 3, Aug. 1994, Jain and Panchanathan taught the hierarchical mode of JPEG, an image compression standard, and the progressive transmission JPEG encoded images. In "Progressive Generation of Control Frameworks for Image Registration," Photogrammetric Engineering and Remote Sensing, vol. 58, no. 9, Sept. 1992, pp. 1321–1328, Chen and Lee taught hierarchical template matching and progressive image registration.

SUMMARY OF THE INVENTION

In this invention, we disclose a query execution method that is significantly less sensitive to the size of the database and complexity of the query. Explicitly, the query results are obtained progressively in terms of

- spatial resolution,
- temporal resolution,
- spectral resolution, and
- numerical accuracy of each element.

In this database, each array attribute of the database is partitioned along each dimension of the attribute. (Note that each attribute could have a combination of spatial, temporal, spectral, and numerical accuracy dimensions.) A schedule for processing partitions of the attributes (or its derived features) is generated statically or dynamically based on the operations and end results required by the query. A schedule of partitions of attributes is also referred to as a schedule of groups. The initial result is generated by processing the first partition on the schedule, the final result is generated after processing the last partition of the schedule, while intermediate results are the results generated by processing other partitions. The final result should be identical to the result generated by processing the attributes as if they are not partitioned.

For a query consisting of several operations, the schedule of each operation is generated so that the elapsed time from the beginning of query processing to the output of the initial result is minimized. Furthermore, the schedule is designed so that among all the unprocessed partitions, the partition which minimizes the difference between the current result and the final result is chosen. As processing proceeds, the schedule needs to be adaptively refined by analysis of the remaining query operations and the query results generated thus far.

The initial and intermediate results can be viewed by an external user or examined by a role-based system. Based on this information, the user or the rule-based system can then navigate the modifications of the query.

The provision of such an adaptive schedule in query processing gives the maximum information within the shortest interval to assist the user and/or the monitoring rule-based system to make decisions regarding to navigating the modification of the query.

Accordingly, this invention provides a method of processing a content based query in a database. With this method a schedule is assigned to each operation of the query. Each schedule represents an order of groups upon which each operation is applied, and each schedule is arranged so that at each step in the schedule a group is chosen which when applied to the operation will yield intermediate results closest to estimated final results.

In summary, we have proposed an output-driven system that allows the specification of the schedule and adaptive modification of the progression order for each operation so that the elapsed time to obtain an approximate version of the final output can be minimized.

BRIEF DESCRIPTION OF THE DRAWINGS

FIG. 3 (comprising FIGS. 3a and 3b) shows an example of processing a query progressively.

DESCRIPTION OF THE PREFERRED EMBODIMENT

Figure 1:
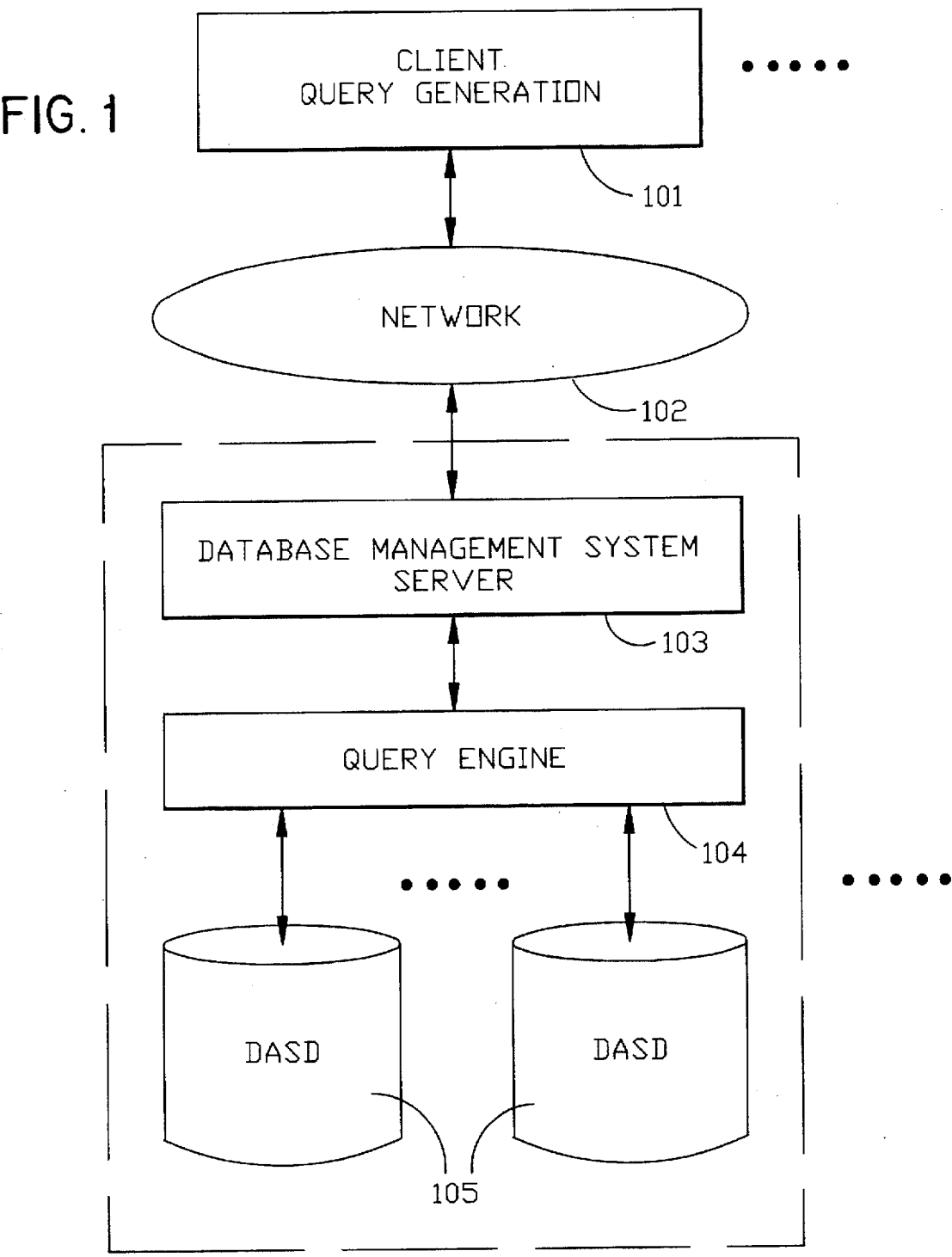
FIG. 1 illustrates a distributed client/server environment in which a client prepares and formulates a query, performs preprocessing, and transmits the query through the network to the server. The server processes the query and transmits the results back to the client for postprocessing and visualization.

A database management system that incorporates the capability of performing content-based search is shown in FIG. 1. A user issues a query from a client system (101) through the network (102) to the database management system server (103). Note that in such a client/server environment, multiple clients and servers can be configured such that the data in the database is either partitioned or replicated among database management servers. The query is then processed by the query engine (104). The query engine searches the database stored on DASD (105) (direct access system devices) attached to the system according to the search criteria specified by or generated from the query. The query results are then transmitted back to the client through the network. The query engine (104) consists of a query parser, a host machine where the parsed queries are executed, a set of access methods, and a file system. Implementation of a query engine is known in the art, and is taught, for example, by C. J. Date in "An Introduction to Database System," Addison-Wesley, 1991.

Figure 2:
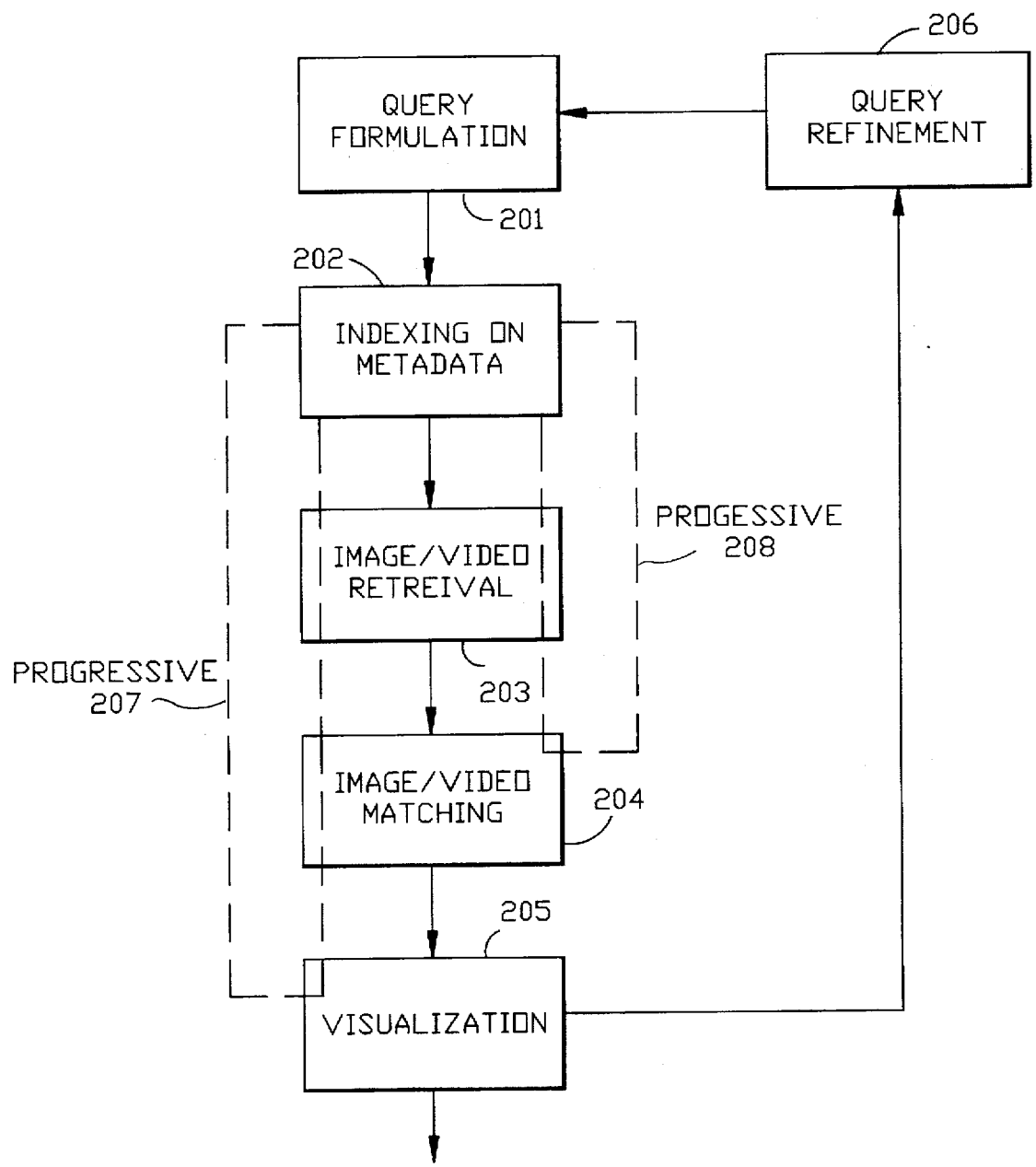
FIG. 2 shows the progressive and iterative refinement of generating and processing a query.

The proposed progressive processing of a content-based query of this invention is shown in FIG. 2. A database management system which allows the progressive processing of partitions of array attributes can consist of the following components:

progressive/hierarchical indexing on metadata,
progressive retrieval of image/video from the storage,
progressive/hierarchical evaluation of queries,
progressive transmission through the network,
progressive visualization of query results,
instantaneous aborting of evaluation/retrieval/transmission/display,
progressive refinement through user feedback.

Progressive operations (e.g., retrieval, evaluation, transmission, visualization, etc.) on image or video data are used to stage the operations on the data in an order such that the elapsed time between initiating a query O/I and obtaining query results is minimized.

In principle, the execution of an operation according to the progression order should generate an output that converges to the final result. An important aspect of the progressive operation is that the schedule is determined adaptively so as to best take advantage of specific properties of the object instance and the query instance. This is explained further below.

A tentative query is first formulated (201) by the user. Each object in the database can consist of both scalar and array attributes. An indexed search through the metadata (scalar attributes) is first performed (202) to prune the search space. Partial or full content of the array attributes (e.g. time series, image or video clips) is then retrieved from the database (203) for those objects whose scalar attributes satisfy the search criteria generated from the query. The content-based processing of the retrieved array attributes is then performed (204). The initial result, which is an approximation of the final result, is reviewed either by the user or a role-based system.

The rules in such a role-based system can be selections of a set of precanned rules made by the user,
entered explicitly by the user,
derived from the model of the source(s) which generates the objects (knowledge-based), or
captured by the system based on usage statistics.

Rule-based expert systems and knowledge representation techniques, are taught in "Knowledge representation," by J. R. Brachman, J. H. Levesque, and R. Reiter, MIT Press, Cambridge, 1992. Knowledge discovery from database is taught, for example in "Knowledge Discovery in Databases," by G. Piatetsky-shapiro and W. Frawley, AAAI Press, Cambridge, 1991.

Based on the review of the initial results, the user or the role-based system may determine the results are not satisfactory (e.g., no hits or too few hits, too many hits, or the results are not what the user intends to have) and thus decide to modify the query (206) by adding new constraints or replacing with fuzzy constraints and then resubmit the query to the query engine. This process is then repeated until the desired results are obtained. In a content based, a "hit" means that the search results that are "similar enough" to the target.

Similar enough usually implies a prescribed distance function such as Euclidian distance and a threshold. The full content of the array attributes that match the query will then be retrieved and transmitted back to the query site for post-processing and visualization (205). The capability of either allowing the user or a rule-based monitoring system to view the intermediate results and provide feedback interactively is essential for content-based search on a large database system with array attributes.

The progressive process for generating initial and intermediate query results could be applied to the cycle consisting of metarista indexing, data retrieval, and content-based image processing (207). Furthermore, this process can also be applied throughout the query processing so that the results presented back to the user are displayed progressively (208).

In order to facilitate progressive operation, the following operations are performed on each array attribute of the database:

feature extraction: The features of images (an example of 2D array attribute) include edges, texture, and shape information. Features of multispectral images (an example of 3D array attribute) include color histogram. Features of video or sequences of images (another example of 3D array attribute) include motion vectors, trajectory of an object, and optical flow.

transformation: Possible transformations include Karhunen-Loeve transformation (or singular value decomposition), Discrete Cosine Transform, subband coding, wavelet transformation (which is a special case of subband coding) and other linear transformations. The transformed array attributes usually retain the same dimension as the original array attributes.

partition: Some of the transformations such as subband coding and wavelet transformation also accomplish partitioning of the representation of the array attributes in the transformed domain (such as into lowpass and highpass components). Other transformation such as Karhunen-Loeve transformation and discrete cosine transformation allow more freedom in terms of partitioning the transformed array attributes. Each transformed coefficient by itself could form a partition. However, the partitioning/grouping of the transformed array attributes should take into the consideration of the optimal granularity for delivering progressive results to the output.

The distinction between feature extraction and transformation is that the feature extraction process is usually irreversible since many-to-one mappings are involved, while transformation is usually reversible. Therefore, the transformed array attributes could substitute the original array attributes to be stored in the database. Techniques of feature extraction, transformation and partitioning of information are taught, for example, in "Digital Image Processing," by W. K. Pratt, Wiley, 1991 which is hereby incorporated herein by reference.

A schedule, which assigns a processing sequence of the partitions (groups) of the transformed attributes (or its derived features), is generated statically or dynamically based on the operations required by the query. The schedule, which represents the order of retrieval and processing of data, is derived using the following algorithm. Let the database be partitioned into groups $P_1, P_2, P_3 \ldots P_N$. Assume operations $F_1, F_2, \ldots F_k$ for a query are to be applied to the groups of data to obtain a final result R. For an operation $F_m$, a schedule is assigned, where the schedule represents the order in which $F_m$ will be applied to the group of data.

Essentially, the schedule would be represented as an ordered sequence of some or all of the groups of data. The schedule assigned to operation $F_m$ would be represented as an ordered sequence of some or all of the groups of data. $F_m$ would first be applied to the first group in the schedule, then to the second group in the schedule, and so on. This order or schedule is chosen according to the following algorithm.

1. Apply operation on groups $P_1, P_2, \ldots, P_N$, generating intermediate results $R_1, R_2, \ldots, R_N$.
2. Compute $D_i = R - R_i$, where R is the final result.
3. Set $Q = P_i P_i$ is chosen so that $D_i$ is minimized.
4. Delete $P_i$ from $P_1, P_2, \ldots, P_N$.
5. Apply the operation on $Q+P_1, Q+P_2, \ldots, Q+P_N$, generating a set of new results $R_{1'}, \ldots, R_{N'}$.
6. Compute $D_{i'} = R - R_{i'}$.
7. Set $Q = Q + Q_2$, where $Q_2 = P_j P_j$ is chosen so that $D_{i'}$ is minimized.
8. Delete $P_j$ from $P_1, P_2, \ldots, P_N$.
9. Repeat the previous four steps until the set P is exhausted.
10. The final result is a schedule or ordered set of groups $Q = P_i, P_j, \ldots$ upon which the operation is applied.
11. The above algorithm is then repeated using another operation until an ordered set of groups for each operation is obtained.

In other words, each partition or group in the schedule is chosen in order to minimize the difference between the current output (intermediate result) and the final output (final results), which could be estimated. Different query operations might require different schedules. Note that the above algorithm, even though it produces the optimal schedule based on a given partition of the transformed attributes, is not always practical. In particular, this algorithm will be very expensive when the array is itself large. Under this circumstance, an adaptive method to produce a schedule is generated where the initial partition (groups) is chosen either with the help from the rule-based system or at random. The next partition could then be selected based on the intermediate results generated by the previous block. In this case, the selection rule is to switch to a different dimension (of an attribute) or to a different attribute, or direction when the current dimension or direction etc. does not produce sufficient difference. Heuristic algorithms such as greatest descent exist to exploit directions with the maximum gradient.

An example of progressive retrieval of objects from a spatial database is shown in FIG. 3. In this example, a query is generated to retrieve all of the past hurricanes with similar tracks to Hurricane Andrew (301). The final result, is thus the tracks of hurricanes which are similar to the tracks of Hurricane Andrew. The track of the Andrew is first calculated progressively, starting from the first $t_s$ and last time instants $t_f$ of the hurricane. The computation (extraction) of the centroid (feature) of the hurricane is also progressive in order to generate increasingly accurate results.

The track (query result) produced by this computation is a line and will be used for retrieving all of the past hurricanes with similar starting and ending points. The third time instant or third time in the schedule is $(t_s + t_f)/2$, and the fourth time instant is $(t_s + t_3)/2$, etc. As more data points on the track of hurricane Andrew are computed, these points can be used to refine the track and to prune the search space. This process will continue as long as either there are more time instants to be computed, or each item the search space is exhausted The resulting schedule (302) is shown in FIG. 3. Note that the initial result of the track is generated after the centroid of the second time instant is evaluated. This is an approximation of the final result after all of the time instants are evaluated. Intermediate results are obtained after evaluating time instants 3–8. Note that progressive schedule is not only applied to the temporal dimension, but also to the spatial dimension. In other words, the lowpass version of each image is analyzed for the approximate location of hurricane Andrew before the high pass images are analyzed. The resulting schedule (or hierarchy of information) is thus like: LP1, LP2, . . . , LP9, HP1, . . . , HP9 where LP and HP represent the lowpass and highpass components of the images at time instants 1 through 9 as indicated. The order in which the groups appear (LP1, LP2, . . . , LP9, HP1 . . . , HP9) also represents the order in which these groups will be retrieved from the database. The knowledge of generating progressively accurate instants is stored in the system (304). Based on this knowledge, the array attributes (images) are retrieved (303) from the database (306). Each image is then subject to the progressive computation in the spatial dimensions (305), i.e., from low resolution to high resolution.

In the proposed scheme, there is a default initial schedule associated with each operation to process partitioned transformed array attributes. As an example, if the next operation is to view satellite images taken at 20 different instants, the progression order starts from the lowest resolution of image 1, then lowest resolution of image 20, the lowest resolution of image 10, the lowest resolution of image 5, the lowest resolution of image 15, . . . until the lowest resolution of the last image is completely displayed. After that, the second lowest resolution of image 1, 20, 10, 5, 15, . . . , are displayed. In other words, each time a new portion of a image (or a number of images) is retrieved/processed/visualized, an original schedule is modified adaptively to generate the final schedule that is to be assigned to a particular operation in an order that maximizes the possibility of displaying differences between the new version and the existing version of display.

Suppose the initial schedule is $Q_1, Q_2, \ldots, Q_N$. Further, assume query F is applied to $Q_1$. The result $R_1 = F(Q_i)$ is then obtained. $R_1$ will then be used to eliminate some of the groups in the set of groups $(P_1, \ldots, P_N)$. Using the newly obtained reduced set of groups, a new schedule $Q_{1'}, Q_{2'}, \ldots, Q_{K'}$ will be obtained. The schedule is continually revised using the above procedure until the final result R is obtained via the final schedule.

More specifically, referring to the example of tracking hurricanes in FIG. 3, query F is to display all the hurricane paths in the database with a path similar to that of hurricane Andrew, where the path of Andrew is unknown to the one issuing the query. The initial schedule is the ordered set of points (in time units) [1, 2, 3, 9]. Point 1, for example, is the earliest possible time in which the hurricane could occur and point 9 is the latest possible time. Now suppose result R1 shows that a hurricane, including hurricane Andrew, starting time point 1 does not exist in the data base. The schedule is thus revised to another set of points [1', 2', 3', . . . , 5']. Then, starting at the point 1', the database is searched for the existence of a hurricane starting at time 1'. The results obtained are then used again to modify the schedule, and this process is repeated until the entire path of hurricane Andrew is found along with all the other hurricanes having a similar path.

Now suppose, for example, the number of hurricanes with paths similar to Andrew is order of $10^3$, which is too large. The query would then be adapted to only hurricanes in a shorter time interval such as in the month of July instead of over a period of six months.

The hurricane information above can be found in the sea-level pressure database maintained by the University of California at Los Angeles and the University of Colorado.

In the above example, points 1 and 2 were chosen so as to minimize the difference between the actual path (final result) and the approximate path (intermediate result) from time point 1 to time point 2 in the above schedule. The difference between the two paths is typically expressed as the means square error between the approximate and actual path.

The ordering of data extraction/operation can be based on one or more of the following criteria:

spatial location, spatial resolution (1D, 2D or 3D), spectral dimension such as luminescence, YUV, RGB, or various IR or RF bands in multispectral earth observing satellites, spectral resolution, instants or interval, temporal resolution, numerical accuracy of each element.

As an example, it is almost universal that most significant bits (MSBs) of a number have more impacts on the final output than the least significant bits (LSBs). Therefore, a schedule for any operations along the numerical accuracy dimension can be produced such that the MSBs are processed first and the LSBs are processed last.

When producing a schedule for an operation, for example in terms of the spatial resolution several possibilities arise. Some are outlined as follows: For the operation of texture analysis, a specific spatial frequency component which corresponding to the stripe repetition rate of the image texture is needed for first-order analysis. For edge detection in image processing, the schedule for partition processing is determined by the width of the edges that need to be detected. For image browsing the processing schedule can be from the group of data consisting of lowpass components to the group of data consisting of highpass components of the signal, as human eyes are most sensitive to low frequency components.

In terms of spectral dimension, the most straightforward schedule is the luminescence followed by visible, infrared, and deep-infrared. However, a specific application such as fire detection from satellite images might require infrared channel first while the presence of biomass is detected through the correlation between visible and near infrared region. In this case, the processing schedule is to assign infrared and visible with nearly identical priority.

The above concept of generating a schedule of groups of video data is now formally described: Denoting a multidimensional array attribute by $I_{x,y,r,s,t}$ where x and y are the spatial location, r is the $r^{th}$ resolution increment in the spatial domain, s is the $s^{th}$ resolution increment in the spectral domain, and t is the $t^{th}$ increment in the temporal domain. Furthermore, we assume the existence of a mapping function W from the tuple (x,y,r,s,t) to i such that the sequence of image/video $I_i$ are retrieved so that $$\lim_{i \to \infty} \Theta \sum_{j=0}^{i} I_j = \Theta \left( \lim_{i \to \infty} \sum_{j=0}^{i} I_j \right)$$

where $\Theta$ is an image operation such as retrieval, correlation, edge detection, classification, visualization. Furthermore, if $\Gamma$ is the measure for the information content (such as the entropy as taught in "Digital Image Processing" by Pratt, Wiley, 1991), $$\Gamma(I_i) \geq \Gamma(I_j)$$

$i \leq j$.

The entropy formula is used to predict the final result, in a statistical sense, when the final result is not available. In other words, the entropy formula can be used to measure the current information content, and measure the difference in information content when another partition is included for processing. Therefore, the block which yields the maximum information increase (from the entropy point of view) will be selected. This is an approximation to the optimal solution in which the partition which minimize the difference between the current result and the final result is selected.

Note that the schedule assigned to an operation in such a content-based query system is always dictated by the subsequent operation. Therefore, it is possible to trace the required schedule from the point where images/video are taken as an input to an operation, producing either image/video or information which is necessary to assist other operations to produce the final result. Sequential viewing of video has only one operation schedule where the display device consumes all the video and images. On the other hand, retrieval of images or video clips involves multiple schedules in which the schedule of image/video sequence is produced by another schedule.

Figure 4:
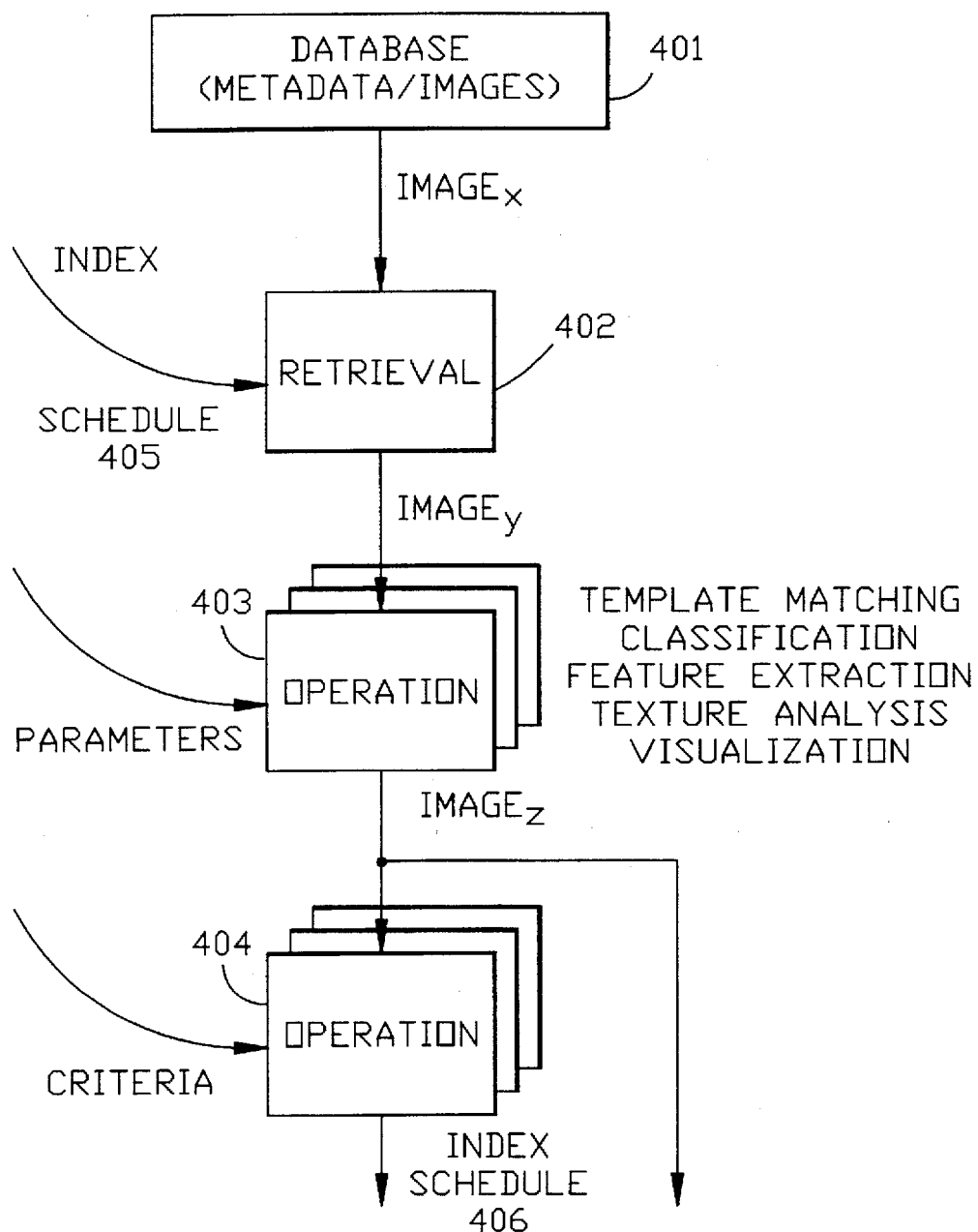
FIG. 4 shows the data and control flow of processing a query and retrieving the data progressively.

The execution of retrieving images (402) from the database (401) based on an input schedule (405), performing operation(s) on the images (403), making decisions (404) on the output of the operations and producing an output schedule (406) for the subsequent retrieval operation is summarized in FIG. 4.

The I-operation and P-operation in this figure is defined as below:

Apparently, there are two types of operations in FIG. 4: An I-operation is an image/video manipulation step which could be matching, retrieval, classification, visualization, scene change detection, etc. Each operation has one array attribute input, one array attribute output, and one schedule input. An S-operation is an image/video manipulation which takes image input and produces an output schedule. Based on these two definitions, I-operations and S-operations can be cascaded together to produce the final output, as illustrated in the next example.

Figure 5:
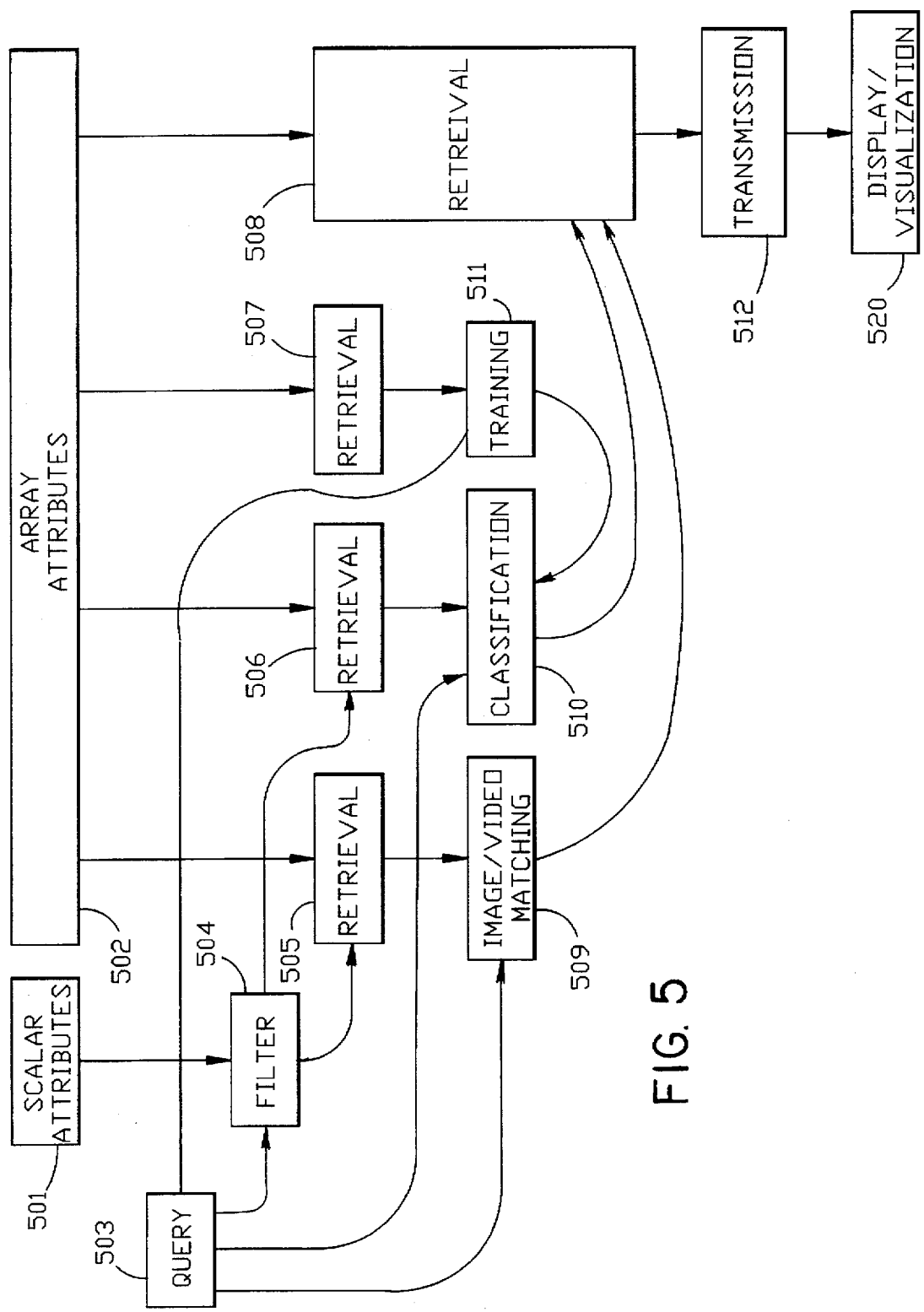
FIG. 5 shows the basic building block of a progressive operation.

In FIG. 5, a query (503) such as the query of all the hurricane paths that are similar to hurricane Andrew is decomposed into multiple instances of the query execution steps (504, 509, 510, 511), connected by the execution schedule. In the hurricane case, the query is decomposed into metadata retrieval, image retrieval, computing the centroid of the hurricane(s) on the image, if any, computing the hurricane path from multiple images, computing the difference between the path of the target (hurricane Andrew) and the other hurricanes, and generate the final results which shows that the paths of those hurricanes have similar paths. Each operation always starts with either the scalar attributes (501) or the array attributes (502). By retrieving these scalar and array attributes (which could include the extract features and transformed array attributes), each individual operation (504, 509, 510, 511) performs some forms of filtering and constraints evaluations where the constraints are derived from the original query. The outputs of the operations 509, 510, and 511 produce a schedule of groups which determines the final schedule of groups for retrieving the array attributes (508), transmitting through the network (512), and for browsing and visualization (520). Note that there could exist multiple instances of the operations and decisions for the same image/video streams retrieved from the database. IBM has a multimedia product that can retrieve images based on the content of the actual images as specified by a user.

Figure 6:
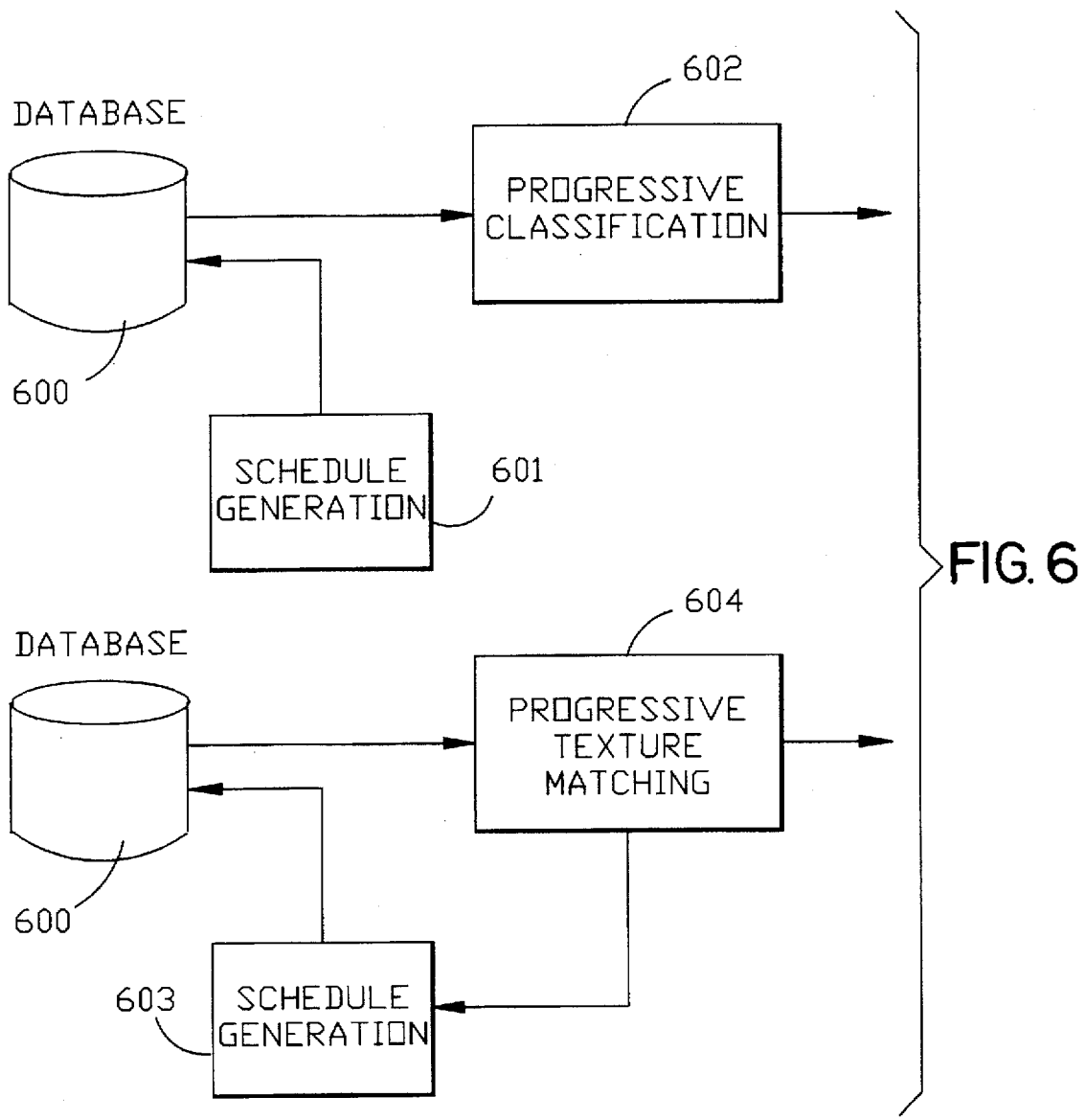
FIG. 6 (comprising FIGS. 6a and 6b) shows alternatives for generating the processing order in a progressive operation.

In FIG. 6, we illustrate two types of schedule generations, namely, static and dynamic, for the operations described in FIGS. 4 and 5. For static schedule generation (601), a given schedule (such as from coarse to fine resolution) is always associated with a given operation independent of the retrieved array attributes. Visualization and classification (602) is the best example in which the order is invariably from coarse to fine. In the hurricane retrieval case, the schedule for computing the centroid of a hurricane is static, as the lower resolution is always used first to calculate the approximate location of the centroid. By contrast, a dynamic schedule (603) is query-dependent and data dependent. This is the case in, for example, texture matching (604) in which the frequency band chosen for comparison is based on the frequency content of the query and the data. In the hurricane case, the selection in the temporal domain is dynamic, as the starting and ending time instants are query dependent.

Having thus described our invention, what we claim as new and desire to secure by Letters Patents is:

1. A method of processing a content based query in a database, said method comprising:
partitioning said database into groups of data; and
assigning a schedule to each operation of a plurality of operations of said query, said schedule representing an order of said groups upon which each said operation is applied, said order in said schedule being arranged so that by each application of each said operation according to said schedule, a group is chosen to minimize the difference between the current result and a final result which will yield intermediate results closest to said final result.

2. A method as recited in claim 1, wherein said schedule for each operation is assigned by a user.

3. A method as recited in claim 1, wherein said schedule for each operation is assigned by a rule based expert system in accordance with a set rules implied by a user query.

4. A method as recited in claim 1, wherein said query is an example of a target result, wherein said example is modified by adding or removing details of the query depending upon the contents of said results.

5. A method as recited in claim 1, wherein each entry of said database comprises a plurality of array attributes, and wherein each of said groups of data comprises selected ones of said array attribute.

6. A method as recited in claim 1, wherein each entry of said database comprises a plurality of array attributes, and wherein each of said array attributes comprises a number of said groups.

7. A method as recited in claim 1, wherein each entry of said database comprises a plurality of array transformed attributes, and wherein each of said groups of data comprises selected ones of said array transformed attribute.

8. A method as recited in claim 1, wherein each entry of said database comprises a plurality of array transformed attributes, and wherein each of said array transformed attributes comprises a number of said groups.

9. A method as recited in claim 3, wherein said query is modified by a user.

10. A method as recited in claim 3, wherein said query is modified by a rule based expert system.

11. A method as recited in claim 10, wherein said data in said database is grouped by feature extraction directly from an array attribute and/or from a transformation of said array attribute of entries in said database.

12. An apparatus for processing a content based query in a database, said apparatus comprising:

means for partitioning said database into groups of data; and means for assigning a schedule to each operation of a plurality of operations of said query, said schedule representing an order of said groups upon which each said operation is applied, said order in said schedule being arranged so that, when applied, each application of said operation according to said schedule results in a group being chosen to minimize the difference between a current result and a final result which will yield intermediate results closest to said final result.

13. A method of processing a content based query in a database, said method comprising the steps of:

partitioning data in said database into a plurality of groups according to group attributes;

establishing a plurality of schedules of said groups, one for each of a sequence of operations of said query;

performing a first of said sequence of operations according to said schedules to produce intermediate query results;

reviewing said intermediate query results to determine whether said query has been satisfied;

performing a next of said sequence of operations on said intermediate results to produce further intermediate results if said reviewing determines that said query has not been satisfied;

analyzing said further intermediate results to determine whether said query has been satisfied; and repeating said performing of said next of said sequence of operations and said analyzing of said further intermediate results until said analyzing determines that said query has been satisfied.

14. The method of claim 13 further comprising the step of adjusting said schedules based on said reviewing.

15. The method of claim 13 further comprising the step of adjusting said schedules based on said analyzing, and wherein said performing a next of said sequence of operations, said analyzing, and said adjusting steps are repeated until said query is satisfied.

16. The method of claim 13 further comprising the step of adjusting said operations of said query based on said reviewing.

17. The method of claim 13 further comprising the step of adjusting said operations of said query based on said reviewing, and wherein said performing a next of said sequence of operations, said analyzing, and said adjusting steps are repeated until said query is satisfied.

18. The method of claim 13 further comprising selecting said group attributes based upon said query prior to said partitioning.

19. The method of claim 13 wherein said reviewing and said analyzing are conducted by a user.

20. The method of claim 13 wherein said reviewing and said analyzing are conducted by a rule based expert system.

21. The method of claim 13 wherein said performing a first of said sequence of operations comprises searching said groups based upon scaler attributes.

22. The method of claim 21 wherein said performing a next of said sequence of operations on said intermediate results comprises searching said intermediate results on array attributes.

23. The method of claim 13 wherein said operations of said query comprises operations selected from the group comprising spatial, spectral, temporal and numerical accuracy attributes of said data.

* * * * *